Dec. 31, 1940.     E. HASSIG     2,227,084
CUTTING TOOL
Filed April 23, 1938

INVENTOR
Edward Hassig
BY
Wheeler, Wheeler & Wheeler
ATTORNEY

Patented Dec. 31, 1940

2,227,084

UNITED STATES PATENT OFFICE 2,227,084

CUTTING TOOL

Edward Hassig, Milwaukee, Wis., assignor to Wetmore Reamer Company, Milwaukee, Wis., a corporation of Wisconsin Application April 23, 1938, Serial No. 203,775

4 Claims. (Cl. 77—58)

This invention relates to improvements in cutting tools, such as boring bars and the like.

It is the primary object of the invention to provide novel and improved means for adjustably fixing the radial projection of a cutter.

More particularly stated, it is my purpose to provide a novel arrangement for securing a cutter adjusting screw against axial displacement, the construction being such as to permit the accurate machining of the bearing surfaces against which the screw is confined without lost motion against axial displacement in either direction.

Other objects will appear in more detail from the following disclosure.

In the drawing.

Like parts are identified by the same reference characters throughout the several views.

Figure 1:
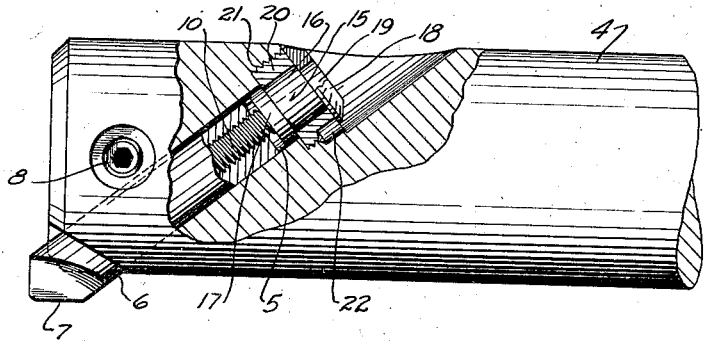
Figure 1 is a view partially in side elevation and partially in axial section, showing a device embodying this invention.

As in my Patent 2,096,489, the invention has been exemplified by disclosing it in conjunction with a boring bar, which provides a tool body 4 having a bore at 5 in which the cutter carrier 6 is axially adjustable to move the cutter 7 to a greater or less radial distance from the center of the boring bar body element 4. The device shown in the above mentioned Patent 2,096,489, or a wedge lock such as is shown in Schmidt Patent No. 2,096,472, or any other desired device, may, so far as this invention is concerned, be used to secure the carrier 6 in adjusted position. I have shown the wedge lock 8 employed for this purpose.

In order to effect the adjustment of the carrier 6 I prefer to provide a tapped pin extending longitudinally of the carrier with which the adjusting screw 10 is in threaded connection. The adjusting screw 10 has a spool-shaped head 15, including a bar 16 beyond which the annular flange 17 and the micrometer dial 18 project radially. In the construction shown in Figure 1 the dial is a separate part, pressed into place on the terminal portion 19 of the screw.

Accurately fitted between the flange 17 and the dial 18 is a screw-threaded plug 20 seated in threaded engagement in the counter-bore 21 of the body 4 of the tool. When the plug is screwed into place so that the bevel of the dial 18 is substantially flush at one point with the periphery of the bar 4, the plug is locked by driving a pin 22 into a recess partially formed in the plug and partially within the body of the tool.

The dial is then pressed onto the screw, leaving the terminal surfaces of plug 20 closely confined between the annular flange 17 of the screw and the dial 18, which is now permanently fixed at the end of the screw. Since all of the surfaces of the plug and dial and flange are easily capable of being accurately machined, it will be apparent that the screw will be so fixed against axial displacement as to permit of the most delicate adjustment of the cutter either inwardly or outwardly without lost motion.

Figure 2:
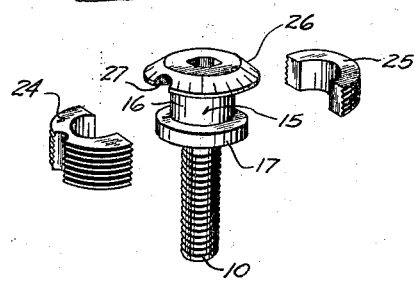
Figure 2 is a diagrammatic view, illustrating in perspective and in relatively separated position, some of the component parts of a modified embodiment of the invention.

In the construction shown in Figure 2 the plug is made in two parts 24 and 25, which can readily be assembled on the spool-shaped head 15 of the screw 10. In this construction the dial 26 may comprise an integral portion of the screw head, being notched at 27 to permit the introduction of the pin 22 for locking the two-part plug against removal in the manner already described. In this case also, the end surfaces of the plug and the opposed surfaces of the flange 17 and the dial 26 are easily susceptible of accurate machining, so that when the parts are assembled as described the screw will be confined, without lost motion, against any displacement in the course of adjustment of the cutter.

I claim:

1. In a device of the character described, the combination with a tool body having a bore and a counterbore, of a tool element reciprocable in the bore, a screw in threaded connection with the tool element and having a head including a portion in the counter-bore, said head having a central cylindrical bearing portion and a plurality of radial flanges, and plug means encircling said head confined between said flanges and disposed in said counter-bore in screw-threaded connection with said body.

2. In a device of the character described, comprising the combination with a tool body having a bore and a tool element reciprocably adjustable therein, of a screw in threaded connection with said element and provided with a spool-shaped head including a central bearing portion and spaced integral flanges, a two-part plug engaged about said central bearing portion and fitted between said flanges, the component parts of said plug being together threaded to said body.

3. In a device of the character described, comprising the combination with a tool body having a bore and a tool element reciprocably adjustable therein, of a screw in threaded connection with said element and provided with a spool-shaped head including a central bearing portion and spaced integral flanges, a two-part plug engaged about said central bearing portion and fitted between said flanges, the component parts of said plug being together threaded to said body, and a pin fixing said plug against rotative release from said body, one of said flanges being provided with an opening for the introduction of said pin.

4. In a device of the character described, the combination with a tool body having a bore and a counterbore and a semi-cylindrical groove at the periphery of the counterbore, said body being provided with threads about said counterbore interrupted by said groove, of a tool element reciprocable in the bore, a screw in threaded connection with the tool element and having a head with a spool-shaped portion in the counterbore comprising radial flanges, plug means encircling the head and confined between the flanges and disposed in the counterbore in screw threaded connection with the body, said plug means having a peripheral groove of semi-cylindrical cross section aligned with the groove of the body, and a pin disposed in the registering grooves of the plug means and body, respectively, and constituting means for anchoring said plug means in the body.

EDWARD HASSIG.